(12) United States Patent
Wenstrand et al.

(10) Patent No.: US 7,990,460 B2
(45) Date of Patent: Aug. 2, 2011

(54) SYSTEM AND METHOD FOR FOCUSING A DIGITAL CAMERA

(75) Inventors: John S. Wenstrand, Menlo Park, CA (US); Patricia E. Johnson, Palo Alto, CA (US); Richard L. Baer, Los Altos, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 12/546,888

(22) Filed: Aug. 25, 2009

(65) Prior Publication Data

US 2010/0002126 A1  Jan. 7, 2010

Related U.S. Application Data

(63) Continuation of application No. 10/989,615, filed on Nov. 16, 2004, now Pat. No. 7,598,996.

(51) Int. Cl.
  *G03B 13/00* (2006.01)
  *H04N 5/232* (2006.01)

(52) U.S. Cl. ......... 348/349; 348/345; 348/354; 348/357

(58) Field of Classification Search ........... 348/345–357
See application file for complete search history.

(56) References Cited

U.S. PATENT DOCUMENTS

| | | |
|---|---|---|
| 3,932,733 A | 1/1976 | Olsen et al. |
| 4,149,792 A | 4/1979 | Fraser et al. |
| 4,348,089 A | 9/1982 | Shenk |
| 4,456,356 A | 6/1984 | Okabe et al. |
| 4,465,352 A | 8/1984 | Hirobe et al. |
| 5,477,296 A | 12/1995 | Takamura et al. |
| 5,652,924 A | 7/1997 | Yamano |
| 5,815,748 A * | 9/1998 | Hamamura et al. .......... 396/104 |
| 5,877,809 A | 3/1999 | Omata et al. |
| 5,973,846 A | 10/1999 | McConica |
| 6,563,543 B1 | 5/2003 | Doron |
| 6,580,062 B2 * | 6/2003 | Baer .......................... 250/201.2 |
| 6,642,956 B1 | 11/2003 | Safai |
| 6,771,391 B1 | 8/2004 | Konishi et al. |
| 6,822,688 B2 | 11/2004 | Ohta |
| 6,839,190 B2 | 1/2005 | Nishioka et al. |

(Continued)

FOREIGN PATENT DOCUMENTS

EP 197734 10/1986

(Continued)

OTHER PUBLICATIONS

British Patent Application No. 0523368.9 Search Report dated Jul. 25, 2006.

(Continued)

*Primary Examiner* — Sinh Tran
*Assistant Examiner* — Anthony J Daniels
(74) *Attorney, Agent, or Firm* — RatnerPrestia

(57) ABSTRACT

A method of focusing a digital camera module with an image sensor including capturing an image of a test target with the digital camera module, determining a focus quality of the image with the image sensor, outputting a signal related to the focus quality of the image from the digital camera module to a focusing station external to the digital camera module, and determining whether a position of a lens from the image sensor within the digital camera module should be altered to improve a focus quality of subsequently captured images.

18 Claims, 6 Drawing Sheets

U.S. PATENT DOCUMENTS

| | | |
|---|---|---|
| 6,963,388 B1 | 11/2005 | Ohta |
| 6,975,348 B2 | 12/2005 | Chiu et al. |
| 7,158,170 B2 * | 1/2007 | Gustavsson et al. ........... 348/187 |
| 7,193,196 B2 * | 3/2007 | Ouellette .................... 250/201.8 |
| 7,215,374 B2 | 5/2007 | Why et al. |
| 7,233,737 B2 | 6/2007 | DeMonte |
| 7,280,149 B2 * | 10/2007 | Weintroub et al. ............ 348/349 |
| 2002/0075393 A1 | 6/2002 | Kim et al. |
| 2002/0179813 A1 | 12/2002 | Baer |
| 2003/0063211 A1 | 4/2003 | Watanabe et al. |
| 2003/0117514 A1 | 6/2003 | Weintroub et al. |
| 2004/0017502 A1 | 1/2004 | Alderson |
| 2004/0066563 A1 | 4/2004 | Voss et al. |
| 2004/0109080 A1 | 6/2004 | Chan et al. |
| 2004/0189862 A1 | 9/2004 | Gustavsson et al. |

FOREIGN PATENT DOCUMENTS

| | | |
|---|---|---|
| GB | 2 397 394 | 7/2004 |
| WO | WO 97-34194 | 9/1997 |

OTHER PUBLICATIONS

British Patent Application No. 0523368.9 Search Report dated Jul. 26, 2006.

British Patent Application No. 0523368.9 Search Report dated Jul. 27, 2006.

* cited by examiner

SYSTEM AND METHOD FOR FOCUSING A DIGITAL CAMERA

This application is a Continuation Application of U.S. application Ser. No. 10/989,615, filed Nov. 16, 2004, now U.S. Pat. No. 7,598,996 the contents of which are expressly incorporated by reference herein.

BACKGROUND

Conventional digital cameras are configured to collect light bouncing off of a subject onto an image sensor through a lens. The image sensor immediately breaks the light pattern received into a series of pixel values that are processed to form a digital image of the subject.

Digital image technology is being used with increasing popularity leading to increasing production volume. The increased production volume is due not only to the increasing popularity of conventional digital cameras but also due to miniature fixed-focused digital cameras being incorporated into various end products, such as mobile telephones (cellular telephones), personal digital assistants (PDAs), and other electronic devices.

During the manufacture of fixed-focused digital camera modules, it is desirable to optimize the positioning of the lens with respect to the image sensor to provide for a relatively well-focused digital image. Conventionally, a camera module is processed within a focusing station. Once placed in the focusing station, the camera module is activated to produce either a still picture or a video signal output depicting a focus target. In order to analyze the picture or video output, the focusing station utilizes a commercial piece of hardware, such as a frame grabber or digital frame grabber, which is used to capture the digital video signals from the camera module for storage in memory of a computer processing unit, such as a personal computer, within the focusing station.

The degree of focus of the images stored within the memory of the station are analyzed by the personal computer to determine the level of camera module focus and whether or not the camera module focus needs to be adjusted. Accordingly, in this conventional operation, the camera module merely outputs the same video or signal streams that the camera module outputs during ordinary use of the camera module. The focusing station breaks down, stores, and performs calculations to the ordinary camera module output to determine the level of camera module focus. In this regard, a fair amount of development and money is spent to provide the focusing system.

SUMMARY

One aspect of the present invention provides a method of focusing a digital camera module with an image sensor. The method includes capturing an image of a test target with the digital camera module, determining a focus quality of the image with the image sensor, outputting a signal related to the focus quality of the image from the digital camera module to a focusing station external to the digital camera module, and determining whether a position of a lens from the image sensor within the digital camera module should be altered to improve a focus quality of subsequently captured images.

BRIEF DESCRIPTION OF THE DRAWINGS

Embodiments of the invention are better understood with reference to the following drawings. Elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "upon," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
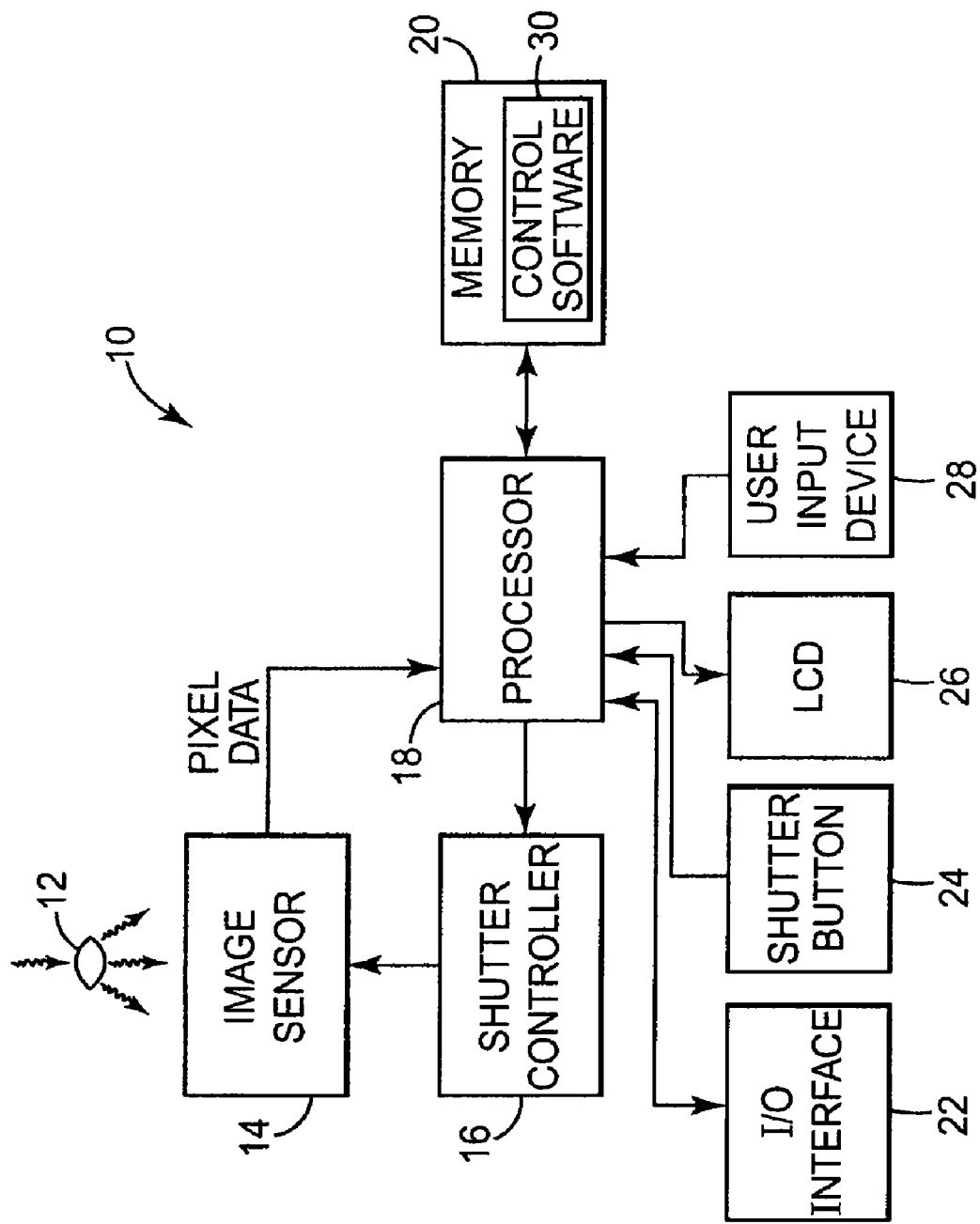
FIG. 1 is a block diagram illustrating one embodiment of the major components of a digital camera.

FIG. 1 is a block diagram illustrating major components of a digital camera 10. Camera 10 includes a lens 12, an image sensor 14, a shutter controller 16, a processor 18, a memory 20, an input/output (I/O) interface 22, a shutter button 24, a liquid crystal display (LCD) 26, and a user input device 28. In operation, when a user presses shutter button 24, processor 18 and shutter controller 16 cause image sensor 14 to capture light bouncing off of a subject (not shown) through lens 12. Image sensor 14 converts the captured light into pixel data, and outputs the pixel date representative of the image to processor 18.

The pixel data is stored in memory 20, and captured images may be displayed on LCD 26. In one embodiment, memory 20 includes a type of random access memory (RAM) and non-volatile memory, but can include any suitable type of memory storage. In one embodiment, memory 20 includes a type or programmable read-only memory (PROM) such as electrically erasable programmable read-only memory (EEPROM). Memory 20 stores control software 30 for controlling processor 18.

I/O interface 22 is configured to be coupled to a computer or other appropriate electronic device (e.g., a PDA, a mobile or cellular telephone, etc), for transferring information between the electronic device and digital camera 10 including downloading captured images from camera 10 to the electronic device. User input device 28 allows a user to vary the user definable settings of the camera 10.

Figure 2:
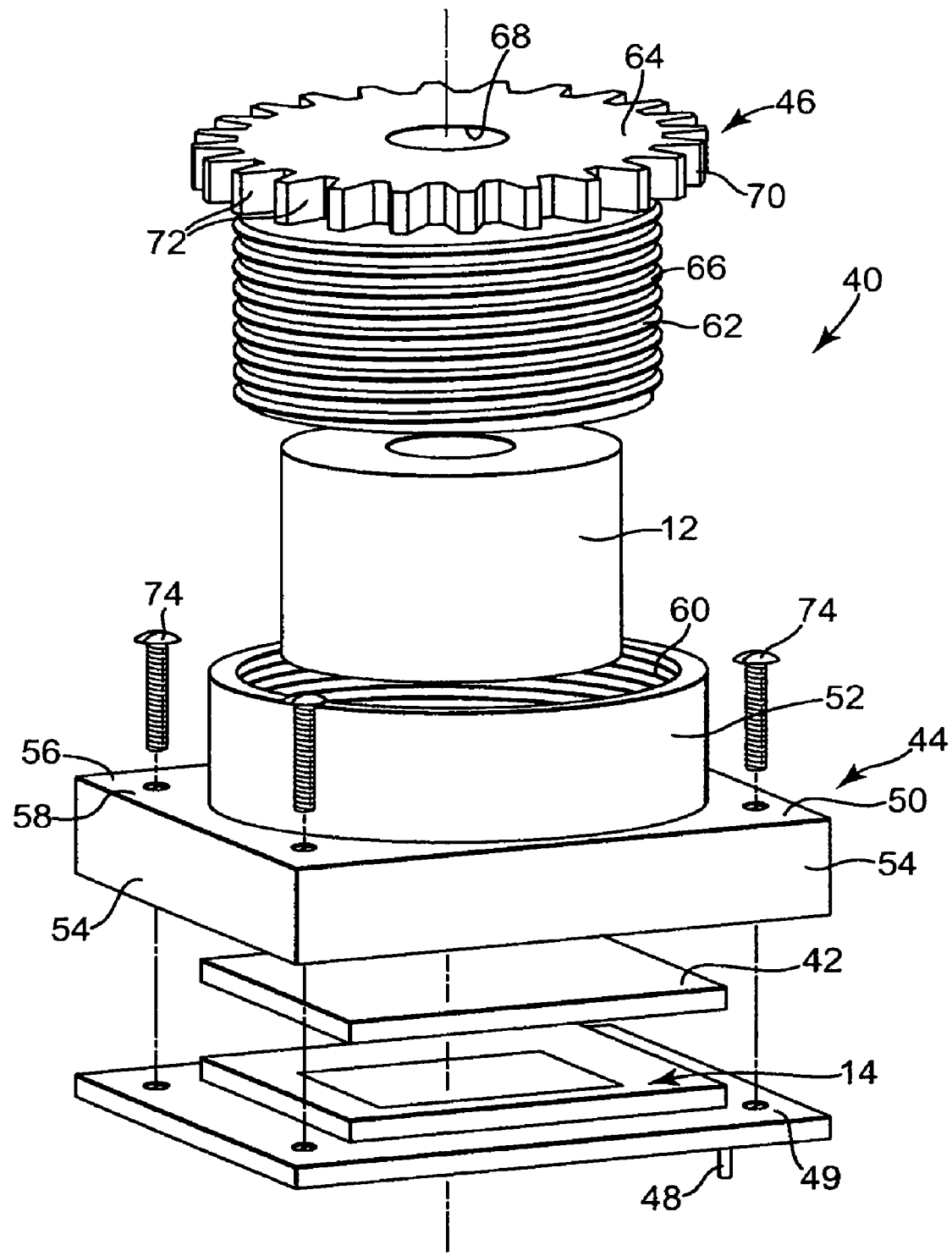
FIG. 2 is an exploded, perspective view of one embodiment of a camera module assembly of the digital camera of FIG. 1.

FIG. 2 illustrates an exploded view of a fixed-focus camera module 40 for use in conventional digital cameras 10 or for incorporating into other electronic devices such as components, PDAs, cellular phones, etc. Camera module 40 includes image sensor 14, an optional infrared filter (IRF) 42, a housing 44, lens 12, and a barrel 46. In one embodiment, image sensor 14 is a charge couple device (CCD) or a complimentary metal oxide semiconductor (CMOS) device. In one embodiment, image sensor 14 not only is capable of capturing images but also includes circuitry able to process the captured images. Image sensor 14 is connected to an output pin 48 or other communication device extending from image sensor 14 to a point external to housing 44. Output pin 48 permits signals or other information to be communicated to other devices. In one embodiment, outlet pin 48 outputs an analog of binary signal.

In one embodiment, image sensor 14 is adapted to function under at least two modes including a general video or photograph output mode and a focus test mode, as will be further described below. In one embodiment, image sensor 14 is mounted to a substrate or housing bottom 49. In one embodiment, IRF 42 is placed upon image sensor 14. IRF 42 filters the light captured by camera module 40 to decrease the contamination of image sensor 14 with infrared (non-visible) light.

In one embodiment, housing 44 includes a base portion 50 and an extension portion 52. Base portion 50 includes four side walls 54 collectively assembled to form base portion 50 in a rectangular manner. A planar member 56 partially extends between an edge of side walls 54. Extension portion 52 extends from an external surface 58 of planar member 56.

In one embodiment, extension portion 52 is centered with respect to side walls 54. Extension portion 52 is annular in shape and defines an inner threaded surface 60. In one embodiment, extension portion 52 is integrally and homogenously formed with base portion 50. In other embodiments, extension portion 52 is integrally secured to base portion 50.

Barrel 46 defines a first annular portion 62 and a second generally annular portion 64. First annular portion 62 defines an outer threaded surface 66 configured to selectively interact with inner threaded surface 60 of housing 44. First annular portion 62 is hollow or tubular in order to circumferentially encompass a lens 12. Second annular portion 64 of barrel 46 extends radially outward and inwardly from first annular portion 62. An aperture 68 is defined in the center of second annular portion 64. Aperture 68 is preferably circular. Second annular portion 64 defines an overall outer diameter greater than an overall outer diameter defined by threaded surface 66 of first annular portion 62. In one embodiment, an outer periphery 70 of second annular portion 64 defines a plurality of teeth 72 circumferentially spaced about outer periphery 70. As such, second annular portion 64 substantially forms a toothed gear.

Upon assembly, IRF 42 is placed upon image sensor 14. Housing 44 is secured to substrate 49 to interpose IRF 42 between image sensor 14 and housing 44. In one embodiment, threaded screws 74 or other fasteners, such as spring clips, etc., are used to couple housing 44 to substrate 49. In an alternative embodiment, housing 44 is attached to substrate 49 or image sensor 14 with an adhesive or other compound rather than with fasteners 74. In one embodiment, housing 44 is coupled to substrate 49 with adhesive and fasteners 74.

Lens 12 is sized to be secured within first annular portion 62 of barrel 46. In particular, in one embodiment, lens 12 has a circumferential outer perimeter that interacts with an inner circumference of first annular portion 62. Barrel 46 is placed at least partially within extension portion 52 of housing 44. In particular, barrel 46 is placed such that threaded outer surface 66 of barrel 46 interacts with threaded inner surface 60 of extension portion 52 to selectively secure lens 12 and barrel 46 to housing 44.

Rotation of barrel 46 causes barrel 46 to move either further into or further out of extension portion 52 of housing 44. As a result, rotation of barrel 46 also serves to move lens 12 either closer to or further way from image sensor 14. Rotation of barrel 46 and the resulting movement of lens 12 with respect to image sensor 14, thereby, allows camera module 40 to be generally focused.

Figure 3:
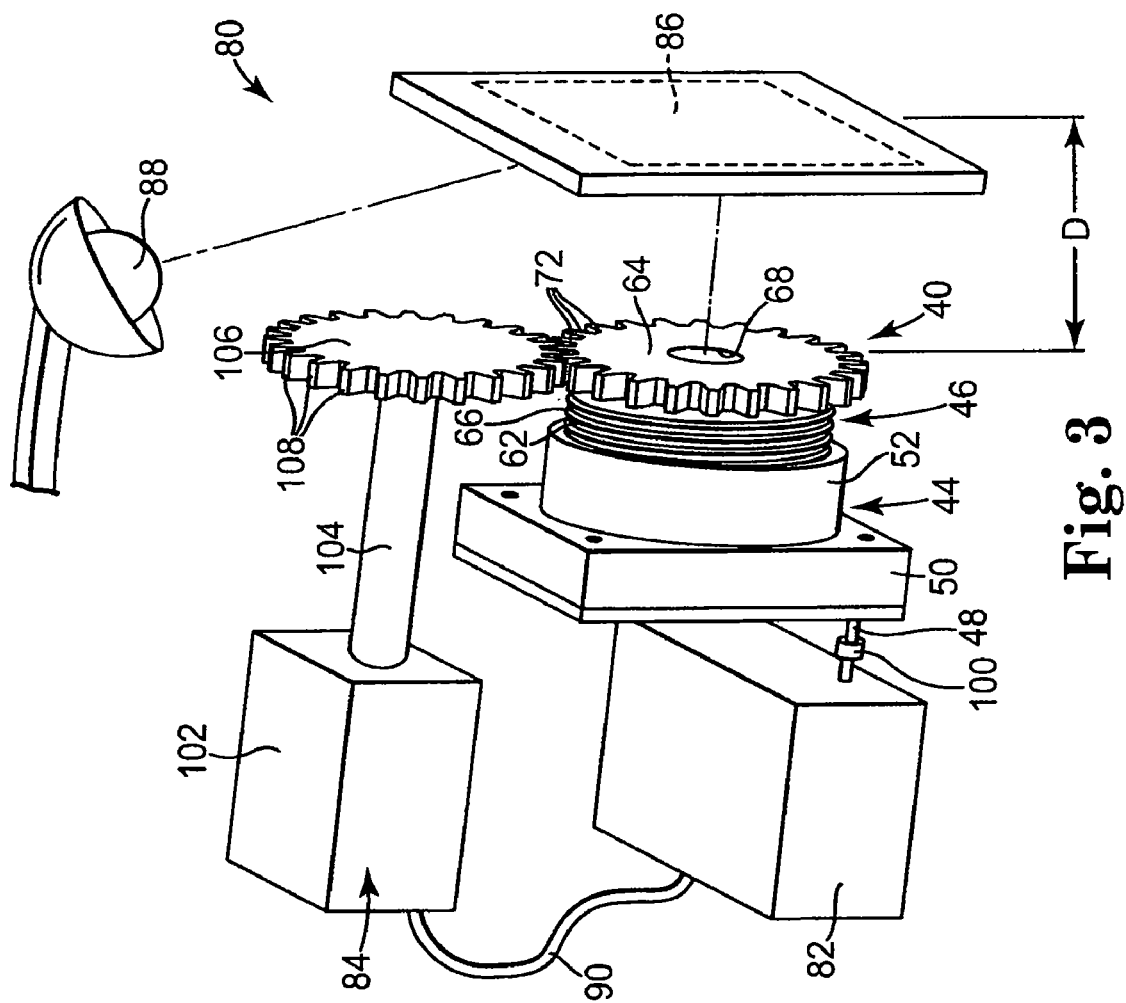
FIG. 3 is a perspective view of one embodiment of the camera module of FIG. 2 within a focus station.

Following assembly of camera module 40, camera module 40 is forwarded to or placed within a focusing station 80, one embodiment of which is illustrated in FIG. 3. Focusing station 80 includes a microcontroller 82, an actuating assembly 84, a test target 86, and a light source 88. Microcontroller 82 is adapted to interface with camera module 40 and is electrically connected to actuating assembly 84, such as via an electrical connection 90. In one embodiment, microcontroller 82 includes a module interface 100 for coupling with output pin 48 of camera module 40. Accordingly, in one embodiment, module interface 100 is configured to receive at least one of analog or binary communication signal from output pin 48. In one embodiment, microcontroller 82 is characterized by an inability to receive video communication from camera module 40.

One embodiment of actuating assembly 84 includes a motor 102, a shaft 104, and a toothed wheel or gear 106. Shaft 104 is electrically coupled to motor 102, which is configured to selectively rotate shaft 104 about its longitudinal axis as directed by microcontroller 82. Gear 106 is coupled to shaft 104 opposite motor 102. Thus, rotation of shaft 104 also induces rotation to gear 106 about an axis of shaft 104.

In one embodiment, gear 106 includes a plurality of teeth 108 extending radially from the remainder of gear 106 and circumferentially spaced from each other about the entire periphery of gear 106. In one embodiment, actuating assembly 84 is positioned with respect to microcontroller 82 so a portion of teeth 108 of gear 106 interface with a portion of teeth 72 of camera module 40 when microcontroller 82 is coupled with camera module 40. Accordingly, upon rotation of gear 106, barrel 46 will be rotated at a similar speed but in an opposite direction.

Test target 86 is generally planar and is spaced from microcontroller 82 such that upon selective coupling of microcontroller 82 with camera module 40, camera module 40 will be directed toward test target 86 to capture an image of test target 86. In particular, test target 86 is positioned such that upon placement of camera module 40 within focusing station 80, camera module 40 will be positioned a distance D from test target 86. In one embodiment, distance D is equal to about a hyperfocal distance of lens 12 of camera module 40.

Figure 4:
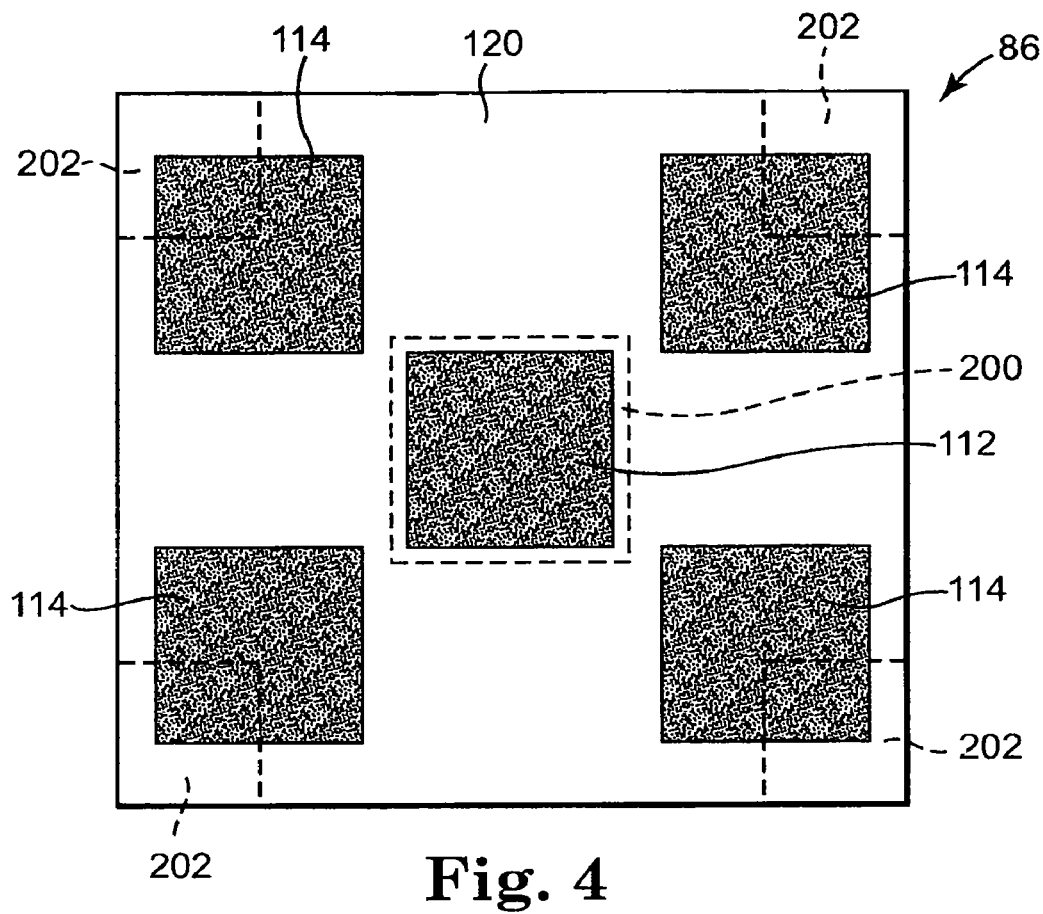
FIG. 4 is a front view of one embodiment of a test target of the focusing station of FIG. 3.

Additionally referring to FIG. 4, in one embodiment, test target 86 includes at least one high contrast figure or object. In particular, in one embodiment, test target 86 includes a white or generally white background 110 with at least one solid black figure or object 112 having definite boundary lines from background 110. Otherwise stated, the boundary lines between background 110 and figure 112 are not blurred or gradual but are definite and crisp. In one embodiment, object 112 is any solid color with high contrast to the color of background 110.

In one embodiment, test target 86 includes a plurality of solid test objects 112 on background 110. For example, test target 86 includes object 112 in positioned near the center of test target 86 and additionally includes a plurality of additional test objects 114 positioned relatively nearer to and spaced about the periphery of test target 86. With this in mind, test target 86 is formed in a general checkerboard-like pattern. Referring to FIG. 3, light source 88 is directed towards test target 86 and provides test target 86 with illumination and light, which will bounce off test target 86 to be captured by lens 12 of camera module 40.

During manufacture, camera module 40 is received by focusing station 80. More particularly, camera module 40 is positioned within focusing station 80 to couple output pin 48 with module interface 100 of microcontroller 82. Camera module 40 is also positioned to be directed toward a test target 86 and so a portion of teeth 72 of barrel 46 interface with a portion of the teeth 108 of gear 106.

Figure 5:
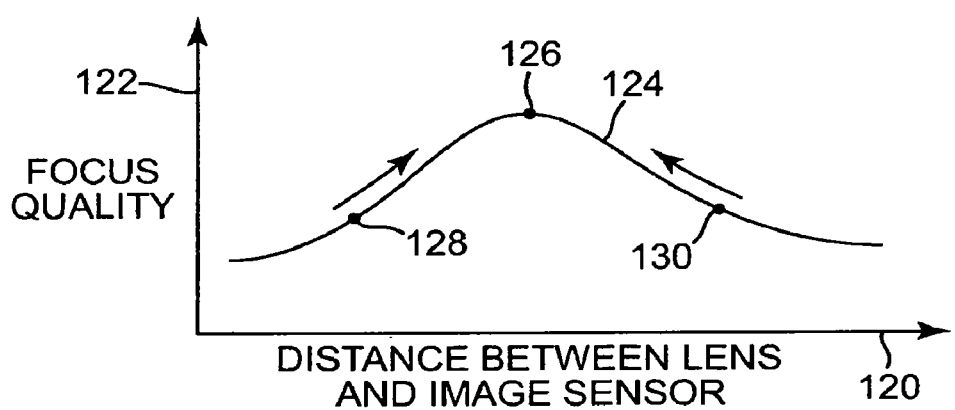
FIG. 5 is a focus optimization graph illustrating a general focus optimization concept.

FIG. 5 graphically illustrates the relationship of the distance between lens 12 and image sensor 14 with respect to focus quality. More particularly, an X-axis 120 represents the distance between lens 12 and image sensor 14. A Y-axis 122 indicates the focus quality. The relationship between the two values resembles a bell curve as illustrated by a curve or line 124. In this respect, an optimum point of focus occurs at the top of curve 124 generally indicated at point 126. In one embodiment, the point of optimum focus 126 is the best focus that can be achieved in camera module 40 under existing conditions within focusing station 80 when being adjusted in preset increments as will be described below.

Due to the relationship illustrated in FIG. 5, during the manufacture of fixed-focus camera modules 40, the distance between lens 12 and images sensor 14 is adjusted to achieve an optimum distance that ensures the images captured by camera module 40 appear focused on image sensor 14. As such, this optimum distance generally corresponds to point of optimum focus 126. The terms "optimum focus," "point of optimum of focus," etc. as used herein refer to the best relative focus level that can be achieved for camera module 40 when the position of lens 12 is adjusted at predetermined increments. Accordingly, optimum focus is not an absolute level of best possible focus.

With this above relationships in mind, if camera module 40 was initially assembled to fall at point 128 upon line 124, then lens 12 would not be positioned to provide the optimum focus quality. If the distance between lens 12 and image sensor 14 is decreased from point 128, focus quality would decrease accordingly. Alternatively, if the distance between the lens 12 and image sensor 14 was increased from point 128, focus quality of camera module 40 would increase.

However, if camera module 40 was initially constructed to fall on point 130, then changes to the distance between lens 12 and image sensor 14 would have the opposite effect as described above for adjustment from point 128. More specifically, an increase in the distance between lens 12 and image sensor 14 would decrease focus quality, while a decrease in the distance between lens 12 and image sensor 14 would increase focus quality. As such, the initial position in which camera module 40 graphs upon line 124 (more specifically, whatever the initial position is to the left or right of point of optimization focus 126) indicates whether or not the distance between lens 12 and image sensor 14 should be increased or decreased to increase focus quality. The workings of this relationship illustrated in FIG. 5 is relied upon to achieve an optimum focus of camera module 40.

Figure 6:
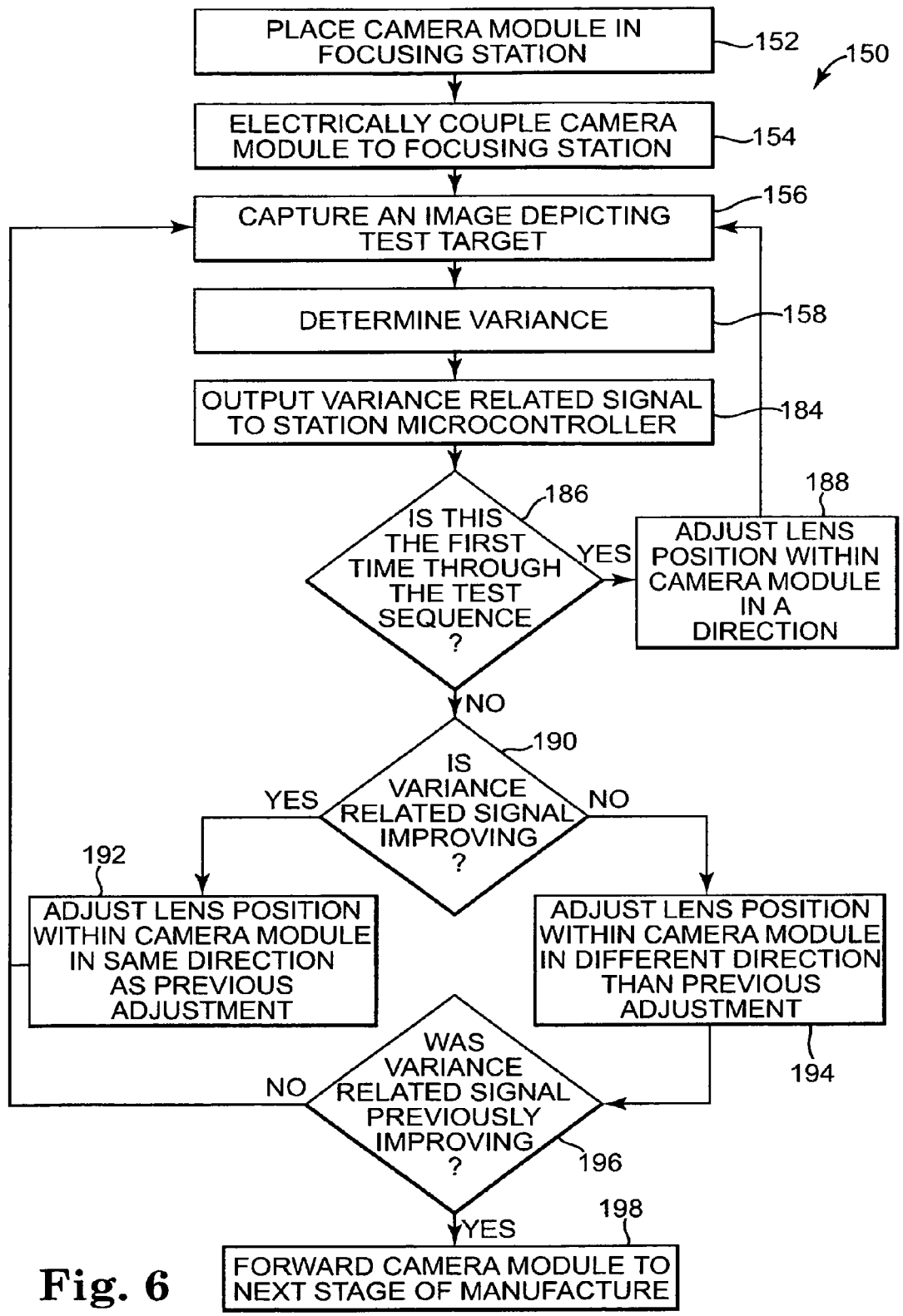
FIG. 6 is a flow chart illustrating one embodiment of a focus optimization method for the camera module of FIG. 2 and based upon the concept of FIG. 5.

For example, FIG. 6 is a flow chart illustrating one embodiment of a focus optimization process generally at 150, which is best described with additional reference to FIG. 3, based upon the concept of FIG. 5. At 152, camera module 40 is placed within focusing station 80. In particular, camera module 40 is positioned to be selectively coupled with microcontroller 82 and lens 12 is directed toward and to capture test target 86. In particular, in one embodiment, camera module 40 is spaced from but centered with respect to test target 86. In one embodiment, focusing station 80 additionally includes a jig or other member (not illustrated) to assist in proper positioning of camera module 40 within focusing station 80.

Once camera module 40 is properly positioned within focusing station 80, a portion of gear teeth 108 of actuating assembly 84 interface with a portion of teeth 72 of camera module barrel 46. At 154, camera module 40 is electrically coupled to focusing station 80. In particular, in one embodiment, microcontroller 82 module interface 100 receives output pin 48 of camera module 40 to receive at least one of analog or binary signals from camera module 40.

At 156, camera module 40 is operated to capture an image depicting test target 86. However, while in focusing station 80, camera module 40 is in a focus mode, rather than the general photography or video mode. Accordingly, upon capturing the image of test target 86, camera module 40 does not directly output a digital representation of the image or video storage. In one embodiment, the image depicting test target 86 captures the entirety of test target 86. For example, when using test target 86 illustrated in FIG. 4, the image depicting test target 86 depicts background 110 as well as an entirety of objects 112 and 114.

Figures 7, 8:
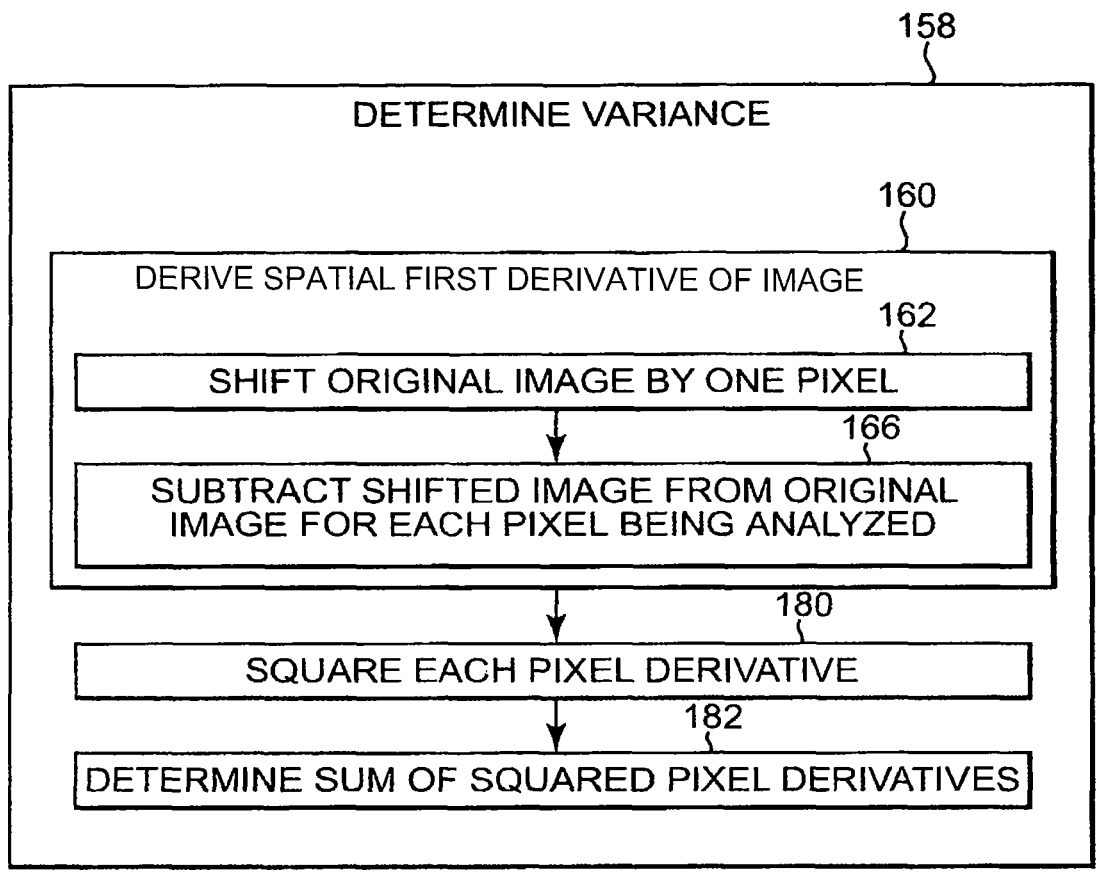
FIG. 7 is a flow chart illustrating a process of determining variance of an image within the focus optimization process of FIG. 6.
FIG. 8 is a front view illustrating shifting of a test target according to the focus optimization process of FIG. 6.

At 158, a variance of a spatial first derivative of the image is determined by image sensor 14 (illustrated in FIG. 2) within camera module 40. Additionally referring to FIG. 7, in one embodiment, determining the variance of the image at 158 includes deriving a spatial first derivative of the image at 160. The first step of deriving the spatial first derivative of the image is shifting the original image by one pixel at 162. As generally illustrated in FIG. 8, the initial or original image 164 depicts test target 86 and accordingly includes representations 167 and 168 depicting objects 112 and 114 (illustrated in FIG. 4), respectively. The original image 164, which is temporarily stored by image sensor 14, is shifted in one direction by one pixel. In the embodiment illustrated in FIG. 8, original image 164 is shifted one pixel in a negative X direction as indicated by arrow 170 to produce a shifted image, which is generally indicated with broken lines at 164'.

At 166, shifted image 164' is subtracted from original image 164 at each pixel being analyzed. For example, in a properly focused image 164, pixel 174 appears as a black pixel. Alternatively, in shifted image 164', pixel 174 appears as a white pixel similar to the target background 110 (illustrated in FIG. 4). By subtracting shifted image 164' from original image 164 at pixel 174, a large positive difference is found at pixel 174 due to the extreme difference between black and white.

At other pixels, such as pixel 176, original image 164 provides pixel 176 as white, while shifted image 164' provides pixel 176 as black. Upon subtracting images at 166, a large negative difference is found. For yet other pixels, the pixels remain either one of black or white in each of images 164 and 164' resulting in zero difference upon subtraction.

Notably, if original image 164 was blurry, pixel 174 may appear gray in original image 164 and/or shifted image 164'. Therefore, upon subtraction of shifted image 164' from original image 164, a relatively lesser positive difference and lesser negative difference would be derived at pixels 174 and 176, respectively. Accordingly, the larger the absolute value for the pixel difference or derivative generally indicates that original image 164 is in better focus than an alternative low absolute value for the difference or derivative at each pixel. Accordingly, once shifted image 164' is subtracted from original image 164 at each pixel, the first derivative, otherwise known as a spatial derivative, is determined for the image 164.

At 180, the difference or derivative found at each pixel in 166 is squared to account for the negative or positive characteristic of the result. By squaring the difference at each pixel, negative differences can be compared directly with positive differences wherein higher absolute or squared values generally indicate a higher degree of focus. At 182, the squared values arrived at 180 are added together to determine a sum of the squared pixel derivatives or differences to arrive at the variance of the spatial first derivative of the image. The variance provides a focus metric of the image 164 is a direct indication of the focus quality of camera module 40. More specifically, the higher the variance of the spatial first derivative of image 164 the better the focus quality of camera module 40.

At 184, the variance is output from camera module 40 to microcontroller 82 via the electrical connection between microcontroller 82 and camera module 40. In one embodiment, the variance is output to microcontroller 82 as an analog signal. More specifically, the relative variance level is output with differing levels of voltage to microcontroller 82, where higher voltages indicate higher variances and vice versa. Accordingly, the voltage level output is directly proportionate to the variance and focus quality. In one embodiment, rather than outputting a voltage indicating variance level to the microcontroller, in one embodiment, the camera module outputs binary communication, such as a +1 value when variance is improving at −1 value when variance is decreasing. In this embodiment, additional comparative steps of the focus optimization process are completed by the image sensor rather than the focusing station microcontroller.

At 186, microcontroller 82 determines if this was the first time through the focus optimization process 150. If it is determined this was the first time through the focus optimization process 150, then at 188, microcontroller 82 signals motor 102 to rotate gear 106 in a first direction by a predetermined increment of rotation. Since teeth 108 of gear 106 interact with teeth 72 of barrel 46, rotating of the gear 106 causes barrel 46 of image controller to also rotate. Due to the threaded connection between barrel 46 and housing 44, the rotation of barrel 46, and therefore lens 12, moves both barrel 46 and lens 12 further into housing or further out of housing 44 a predetermined increment or amount.

Once the distance of lens 12 from image sensor 14 has been altered in a first direction (i.e. either closer to or further away) from image sensor 14 at a predetermined increment, steps 156, 158, 184, and 186 are repeated. If at 186, it is determined that this is not the first time through the focus optimization process 150, then at 190, microcontroller 82 determines if the variance related signal is improving as compared to the variance related signal received the previous time through the sequence. In particular, if the second variance related signal is higher than the first variance related signal, then the variance related signal is improving. Conversely, if the second variance related signal is less than the first variance related signal, then the variance related signal is not improving.

If the variance related signal is found to be improving, then at 192, the microcontroller 82 signals actuating assembly 84 to adjust the distance between lens 12 and image sensor 14 in the same direction lens 12 was previously adjusted at step 188. For example, if actuating assembly 84 rotates gear 106 clockwise at step 188, then at step 192, actuating assembly 84 would once again rotate gear 106 clockwise. In one embodiment, upon each adjustment the distance between lens 12 and image sensor 14 is changed by a predetermined increment in the range of about 2 microns to about 20 microns. In a more particular embodiment, each predetermined increment is in the range of about 5 microns to about 10 microns.

Following the second adjustment at 192, steps 156, 158, 184, 186, and 190 are repeated. If at 190, it is determined that the variance related signal is not improving, then at 194, microcontroller 82 signals actuating assembly 84 to adjust the distance lens 12 extends from image sensor 14 (illustrated in FIG. 2) in a direction opposite the direction lens 12 was adjusted in the most recent previous step 188 or 192. Otherwise stated, if the motor 102 rotated gear 106 in a clockwise direction in previous step 188 or 192, then at 194, motor 102 rotates gear 106 in a counterclockwise direction. Accordingly, barrel 46 with lens 12, which was initially moved one increment closer to image sensor 14 via the clockwise rotation of gear 106, would now be moved one increment further away from image sensor 14 via the counterclockwise rotation of gear 106.

Following the adjustment of lens 12 at 194, then at 196, microcontroller 82 determines if the variance related signal was improving prior to the most recent completion of step 190. If is determined at 196 that the variance related signal was previously improving, it indicates that the focus quality or variance was increasing towards the point of optimum focus (see point 126 in FIG. 5) and actually passed beyond the point of optimum focus 126 to decrease overall focus quality. Therefore, the adjustment of the distance between lens 12 and image sensor 14 back by a single increment at 194 returns lens 12 to a distance from image sensor 14 corresponding to the point of optimum module focus. Therefore, focus testing and fixing is complete, and at 198, the camera module is forwarded to the next stage of manufacture.

Conversely, if at 196 it is determined the variance related signal was not previously improving, it indicates that lens 12 was previously being adjusted in the wrong direction to increase focus quality, in other words, lens 12 was being adjusted to actually decrease focus quality as described above with respect to FIG. 5. Therefore, by moving lens 12 in a different direction at 194, lens 12 is now being adjusted in the proper direction to increase focus quality (i.e. to move toward point of optimum focus 126 illustrated in FIG. 5). Following the determination at 196 that the variance related signal was not previously improving and that lens 12 is now being adjusted in the proper direction, process 150 returns to step 156 where steps 156, 158, 184, 186, and 190 as well as steps 192 or 194 are complete. The process is continued until focus optimization process 150 continues to step 198, described above, where optimum focus of camera module 40 is achieved and the focus of camera module 40 is fixed (i.e. the distance between lens 12 and image sensor 14 is fixed so as not to be adjustable during use of camera module 40).

In one embodiment, rather than moving past point of optimum focus 126 in a first direction and backing up a single increment to return to point 126 as described above, lens 12 is moved from the first discovery of decreasing variance following previous improvements in variance a known offset distance in either direction to achieve a desired level of optimum focus. In one embodiment, after passing point of optimum focus 126 in a first direction, lens 12 is moved in the opposite direction to once again pass point of optimum focus 126 to effectively define a range of optimum focus. Upon identifying the range of optimum focus, in one embodiment, lens 12 is moved either to the midpoint of the identified range of optimum focus or moved a predetermined offset from the midpoint to rest at the desired point of optimum focus. In one embodiment, the method chosen to determine the desired point of optimum focus is dependent at least in part upon the mechanical tolerance and precision of camera module 40 and focusing station 80.

A focus optimization process and system as described above permits a large amount of the test process to be actually completed by the image sensor rather than by the focusing station. By utilizing processing elements already generally disposed on the image sensor, the hardware and assembly time of the focusing station can be decreased. More particularly in one embodiment, the focusing station would no longer require a computer processing unit with complicated hardware, such as frame grabbers, and associated software.

Rather, in one embodiment, the focusing system merely requires a microcontroller to perform nominal processing tasks and to signal actuating assembly to alter the distance the lens is spaced from the image sensor. By decreasing the hardware and preparation needed to prepare each focusing station, the overall cost of providing a focusing station is decreased. In addition, by eliminating a frame grabber step in the focus optimization process, the speed of the focus optimization process is increased.

The speed of the focus optimization process 150 can further be increased by additionally altering the process of determining the variance of the image depicting test target 86. For example, as illustrated with additional reference to FIG. 4, rather than analyzing the entire area of the original image depicting the test target 86, only the areas of the image depicting at least one region of interest generally indicated by broken lines 200 are analyzed.

For example, the focus test mode of camera module 40 may be configured to only analyze region of interest 200 of the original image. Since region of interest 200 depicts at least a portion of the background 110 as well as a portion of the object 112 including a boundary line between background 110 and object 112, a similar method of determining the variance is completed as that described above except for only region of interest 200 rather than the entire original image is considered. Accordingly, since less pixels are analyzed, the overall time needed to complete the focus optimization process is decreased. In this embodiment, image sensor 14 is programmed with prior knowledge of the layout of test target 86 to ensure the analyzed region of interest 200 includes a portion of background 120 and a portion of test object 112 as well as the boundary line formed therebetween.

In one embodiment, multiple regions of interest are selected from within the original image and are used to determine the variance of the image. For example, in one embodiment, not only is region of interest 200 identified but additional regions of interest 202 are also identified and analyzed. In one embodiment, regions of interest 200 and 202 are spaced throughout the original image so the overall focus level achieved by focus optimization method 150 is more indicative of the focus of the image being captured.

In particular, due to the normally rounded or spherical cut of lens 12, optimized focus in the center of the image (such as at region of interest 200) may not indicate optimum focus near the edges of the image (such as at region of interest 202). Accordingly, by spacing the regions of interest 200 and 202 at various positions within the original image, the resulting variance is indicative of the overall or collective focused quality of the entire image. Notably, each region of interest 200 or 202 includes at least a portion of background 110 and object 112 or 114 including a boundary between background 110 and object 112 or 114. In one embodiment, regions of interest 200 and 202 collectively define less than 50% of the entire captured image. In one embodiment, each region of interest 200 and 202 individually define less than 25% of the captured image. In one example, each region of interest 200 and/or 202 individually defines about 5% of the captured image. In this respect, by utilizing regions of interest 200 and 202, the same general focus optimization method 150 described above is utilized. In a more particular embodiment, each region of interest defines less than 2% of the captured image, and the plurality of regions of interest collectively define less than 10% of the captured image. However, since a smaller portion of the captured image is analyzed at each step, the overall speed of completing the focus optimization method 150 is increased.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of focusing a digital camera module with an image sensor, the method comprising:
   capturing images of a test target with the digital camera module;
   determining a focus quality of each respective captured image with the image sensor in accordance with a variance in a spatial first derivative generated based on overlapping and offset first and second portions of the respective captured image, the variance determined by analyzing only one or more regions of interest of the respective captured image, the one or more regions of interest collectively defining less than 50% of an entirety of the respective image, the first and second portions of the respective captured image encompassed within the one or more regions of interest;
   generating, from the digital camera module, a binary output signal, indicative of whether the focus quality is increasing as subsequent images are captured;
   sending the binary output signal to a focusing station external to the digital camera module; and
   changing, by the focusing station, a position of a lens from the image sensor within the digital camera module to adjust the focus quality of the subsequently captured images in accordance with the binary output signal.

2. A method according to claim 1, wherein the determining of the variance of the spatial first derivative of each respective captured image includes determining the spatial first derivative of each respective captured image.

3. A method according to claim 1, wherein the respective image is a second image captured after a first image, and wherein the binary output signal indicates that the focus quality of the second image is one of an improved focus quality or a decreased focus quality relative to the focus quality of the first image based on a comparison of the variance of the spatial first derivative of the second image with a variance of a spatial first derivative of the first image.

4. A method according to claim 1, wherein the changing of the position of the lens is repeated a plurality of times, wherein each time includes moving the lens in an increment equal to a preset distance.

5. A method according to claim 4, wherein the repeated changing of the position of the lens includes positioning the lens relative to the image sensor to optimize the focus quality.

6. A method according to claim 5, wherein the changing of the position of the lens includes determining a direction the lens is to be adjusted to improve the focus quality.

7. A digital camera module for capturing images depicting a test target, the digital camera module including:

an image sensor for operating in a focus mode in which the image sensor (i) determines a focus quality of each respective captured image in accordance with a variance in a spatial first derivative generated based on overlapping and offset first and second portions of the respective captured image, the variance determined by analyzing only one or more regions of interest of the respective captured image, the one or more regions of interest collectively defining less than 50% of an entirety of the respective image, the first and second portions of the respective captured image encompassed within the one or more regions of interest, and in which the image sensor (ii) generates a binary output signal, indicative of whether the focus quality is increasing as subsequent images are captured, sent to a focusing station external to the digital camera module; and a lens spaced from the image sensor, wherein a distance the lens is spaced from the image sensor is adjustable, by the focusing station, based on the binary output signal.

8. A digital camera module according to claim 7, wherein the one or more regions of interest are selected based on a position of test objects on the test target.

9. A digital camera module according to claim 7, wherein the digital camera module is a fixed-focus camera module.

10. A focusing station for fixing the focus of a digital camera module, the focusing station including:
an actuating assembly for interfacing with a barrel of a digital camera module;
a microcontroller for receiving a binary output signal from the digital camera module indicative of whether focus quality is increasing as subsequent images are captured by the digital camera module and for determining which direction to rotate the barrel to improve the focus quality of the subsequent images based on the binary output signal received from the digital camera module,
wherein the direction indicated by the binary signal to rotate the barrel is in accordance with a difference of:
(1) a variance in a first spatial first derivative generated based on overlapping and offset first and second portions of a respective captured image; and
(2) a variance in a second spatial first derivative generated based on overlapping and offset first and second portions of a subsequent captured image,
wherein the variances are determined by analyzing only one or more regions of interest of the respective captured image and the subsequent captured image, the one or more regions of interest collectively defining less than 50% of an entirety of the respective and subsequent captured images, the first and second portions of the respective captured image and the subsequent captured image encompassed within the one or more regions of interest.

11. A focusing station according to claim 10, wherein the binary output signal indicates whether the focus quality of the subsequent captured image has improved since a previous rotation of the barrel.

12. A focusing station according to claim 10, wherein the microcontroller is not configured to receive video input from the digital camera module.

13. A focusing station according to claim 10, including:
a test target including a background and a plurality of discrete solid color objects, each of the discrete solid color objects being of a color contrasting with the background; and
wherein the focusing station receives the digital camera module in a position to capture the images of the test target.

14. A method of determining focus quality of a camera module, the method including:
providing a test target including a background and at least one object on the background, wherein the background and the at least one object have contrasting colors;
capturing images of the test target with the camera module having a lens barrel;
analyzing, in the camera module, only one or more regions of interest within each of the images to determine the focus quality of the camera module, wherein the one or more regions of interest depict portions of the background and portions of the at least one object and the one or more regions of interest for each image collectively define less than 50% of an entirety of the respective image;
outputting, by the camera module to a test station, a binary output signal indicative of whether the focus quality is increasing as subsequent images are captured by the camera module; and
determining, by the test station, which direction to rotate the lens barrel to improve the focus quality of the subsequent images based on the binary output signal received from the camera module,
wherein the analyzing includes comparing a variance in a spatial first derivative generated based on overlapping and offset first and second portions of a respective captured image.

15. A method according to claim 14, wherein the analyzing of the one or more regions of interest includes determining a variance of each of the one or more regions of interest.

16. A method according to claim 14, wherein the at least one object is a plurality of objects, and each of the one or more regions of interest depicts a portion of the background and a portion of a different one of the objects.

17. A method according to claim 14, including:
programming an image sensor of the camera module with knowledge of positions of the one or more regions of interest prior to capturing the images of the test target,
wherein the image sensor analyzes the one or more regions of interest based on the programmed knowledge.

18. A method according to claim 1, further comprising the steps of:
generating, from the digital camera module, a signal indicative of a range of optimum focus quality; and
changing, by the focusing station, a position of a lens from the image sensor within the digital camera module to adjust the focus quality of the subsequently captured images in accordance with the signal indicative of the range of optimum focus quality.

* * * * *